United States Patent Office 2,837,417
Patented June 3, 1958

2,837,417

METHOD FOR MODIFYING THE GROWTH CHARACTERISTICS OF PLANTS

John R. Fisher, Fresno, Calif., assignor to The Dow Chemical Company, Midland, Mich., a corporation of Delaware No Drawing. Application August 12, 1954
Serial No. 449,510

8 Claims. (Cl. 71—2.7)

This invention is concerned with the modification of the growth characteristics of plants and is particularly directed to compositions and methods for suppressing the growth of vegetation and for promoting the maturing of crops and facilitating their harvest.

In recent years there has been an increasing demand in the agricultural field for contact herbicides, i. e. toxic agents which kill the viable form of the plant contacted therewith. For example, certain distillates derived from petroleum have been found useful in killing young seedling weeds in carrot fields, the carrots being relatively resistant to this type of compound. Various nitro- and halophenols and their derivatives have also found application as contact herbicides. However, objectionable characteristics have been encountered in the use of the presently known herbicides. Thus, with many materials considerable variation in herbicide action is encountered depending upon such factors as temperatures, soil moisture and the stage of growth of the vegetation to be treated. With other of the proposed products, substantially large dosages of toxic chemical are required in order to effect a commercial vegetative control.

In the field of plant maturation where chemical agents may be used to prepare crops such as cotton, beans, peppers, flax, rice, potatoes, tomatoes, and the like for more efficient harvesting, no completely satisfactory agent has yet been encountered. Desirable plant maturation agents should be effective, for example, in accomplishing the defoliation of cotton, beans and the like, hastening the ripening of fruit or grain and in decreasing the moisture content of rice and milo prior to harvesting. The wide variety of climatic conditions at harvesting time in various parts of the country where such crops are grown make necessary a maturation agent which will penetrate the plant foliage readily, be active under conditions such as low soil moisture or low or high morning dews and, at the same time, be non-injurious to that portion of the plant which is to be harvested.

It is an object of the present invention to provide a novel method and composition for modifying the growth characteristics of plants. Another object is to provide a novel method for the suppression of the growth of vegetation. A further object is to provide an improved method for promoting the maturing of crops prior to harvest and of nursery stock prior to storage, and for facilitating the harvest of plant crops. An additional object is the provision of an improved method for the defoliation of cotton. Yet another object is the provision of novel compositions to be employed in these methods of growth modification. Other objects will become apparent from the following specification and claims.

According to the present invention, it has been discovered that the growth characteristics of plants may be modified or altered by exposing a viable form of the plant to the action of a growth altering amount of a dithiooxamide of the formula

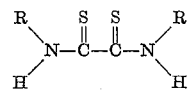

wherein R represents an alkyl radical containing from 2 to 6 carbon atoms, inclusive. It has been discovered further, that with the proper control of the dosage of the dithiooxamide compounds, the maturation of many crop plants may be facilitated and their harvest promoted without substantial injury to that portion of the plant to be harvested.

The dithiooxamides are crystalline solids or viscous liquids which are somewhat soluble in many of the common organic solpents and of very low solubility in water. They are particularly adapted to be employed as active toxic constituents of contact herbicide and plant maturant compositions.

The exposure of a viable form of plants to the action of the dithiooxamides gives rise to differing responses depending upon the nature of the plant, the stage of growth or maturity of the plant and the dosage of dithiooxamide at which the exposure is carried out. Exposure of the plants to a herbicidal amount of the dithiooxamide compounds suppresses the growth of a wide variety of annual and perennial weeds and grasses. Thus, it is possible to employ the present invention to effect a substantial denuding of the soil when desired.

Where plant maturation is concerned, the dithiooxamides are applied to the foliage of field crops at a time near the end of their normal growing season and at a dosage sufficient substantially to accelerate the maturing of the crop. This treatment accomplishes an early and uniform ripening of the fruit or other agricultural product and a rapid defoliation of the plant so as to facilitate the gathering of the crop. In certain instances such as with rice and milo, the treatment induces a dehydration effect which results in a decrease in the moisture content of the grain. Such treatment permits an earlier harvest of the grain crop.

The exposure of the plant to the action of a growth altering amount of the dithiooxamides is essential for the practice of the present invention. Where the killing of vegetation is concerned, the exact dosage to be employed is dependent upon the plant species concerned and the stage of growth as well as upon the dithiooxamide employed. Good controls of many weed species are obtained with N,N'-diethyl dithiooxamide, N,N'-diisopropyl dithiooxamide and N,N'-diisoamyl dithiooxamide when these toxicants are applied at a substantially uniform dosage of at least 12 pounds per acre. With the other dithiooxamides, dosages of 0.8 pound per acre give satisfactory controls of many species of weeds.

Where plant maturation is concerned, the dosage may be regulated so as to accomplish the defoliation, ripening and/or dehydration effect without appreciable injury to the portion of the plant to be harvested. These dosages are dependent upon the crop plant concerned as well as the particular dithiooxamide employed. For example, good defoliation results are obtained on peppers with N,N'-di-n-butyl dithiooxamide and N,N'-di-n-propyl dithioxamide at dosages of from 0.1 to 2 pounds per acre.

With the other dithiooxamides, dosages of at least 3.0 pounds or more per acre are required for good pepper defoliation, while dosages up to 6 pounds are often employed. Good maturation and defoliation of cotton is obtained with N,N'-di-n-butyl dithiooxamide and N,N'-di-n-propyl dithiooxamide at dosages of from 0.5 to 4 pounds per acre. Dosages of at least 8 pounds or more per acre of the other dithiooxamides are required for good maturation of cotton, while dosages up to 20 pounds may be employed. These same maturation dosages for cotton give excellent maturation of rice.

The method of the present invention may be carried out by exposing the plants to the action of the unmodified dithiooxamides. However, the present method also embraces the employment of a liquid or dust composition containing the toxicants. In such usage, the dithiooxamides may be modified with one or a plurality of additaments or adjuvants for plant growth control compositions such as water or other liquid carriers, surface active dispersing agents and finely divided inert solids. Depending upon the concentration of toxicant, such augmented compositions are adapted to be applied to plants or to be employed as concentrates and subsequently diluted with additional inert carrier to produce the ultimate treating compositions.

The exact concentration of the dithiooxamides to be employed in the treating compositions is not critical and may vary considerably provided the required dosage of effective agent is supplied upon the plant foliage. The concentration of toxicant in liquid compositions employed to supply the desired dosage generally is from about 0.01 to 50 percent by weight. Concentrations up to 95 percent by weight are oftentimes conveniently employed. In dusts, the concentration of toxicant may be from about 0.1 to 20 percent by weight. In compositions to be employed as concentrates, the toxicant may be present in a concentration of from about 5 to 95 percent by weight.

The quantity of the composition applied is not critical provided only that the required dosage of active ingredient is applied in sufficient of the finished composition to cover adequately the vegetation to be treated. In the treatment of fields to control seedling weeds and grasses, good coverage is obtained when using from 10 to 60 gallons of a finished spray composition per acre. Where large succulent vegetation is concerned, it is frequently desirable to employ up to 250 gallons or more of the finished spray composition to assure complete coverage of the above-ground portion of the vegetation. For the maturation of crops such as peppers, beans, cotton and rice, good results are obtained when applying from 7 to 30 gallons of finished spray mixture per acre applied by airplane and from 15 to 250 gallons per acre applied by ground equipment. In the direct application of dusts to plant foliage, good results are obtained with from 40 to 200 pounds of finished dust per acre, the only requirement being that required toxicant dosage be applied in sufficient dust to achieve good coverage of the foliage.

Liquid compositions containing the desired amount of active ingredient may be present by dissolving the toxicant in an organic liquid carrier or by dispersing the toxicant in water with the aid of a suitable surface-active dispersing agent such as an ionic or non-ionic emulsifying agent. The aqueous compositions may contain one or more water-immiscible solvents for the dithiooxamide compound. In such compositions, the carrier comprises an aqueous emulsion, i. e. a mixture of water-immiscible solvents, emulsifying agent and water. The choice of dispersing and emulsifying agent and the amount thereof employed is dictated by the nature of the composition type and by the ability of the agent to facilitate the dispersion of the dithiooxamide compound in the aqueous carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether-alcohols, mahogany soaps and the like.

In the preparation of dust compositions, the active ingredient is dispersed in and on a finely divided inert solid such as talc, chalk, gypsum and the like. In such operations, the finely divided carrier is mixed with the dithiooxamide compound or a volatile organic solvent solution thereof. Similarly, dust compositions containing the dithiooxamide compounds may be prepared from various of the solid surface active dispersing agents, such as bentonite, fuller's earth, attapulgite and other clays. Depending upon the proportion of ingredients, these dust compositions may be employed as concentrates and subsequently diluted with additional solid surface active dispersing agent or with talc, chalk or gypsum and the like to obtain the desired amount of active ingredient in a composition adapted to be employed for the modification of the growth characteristics of plants. Also, such concentrate dust compositions may be dispersed in water with or without the aid of a dispersing agent, to form spray mixtures.

When operating in accordance with the present invention, growth altering amounts of the dithiooxamide compounds or compositions containing such toxicants are applied to the above-ground portion of plants in any convenient fashion, e. g. with power dusters, boom and hand sprayers and spray dusters.

The following examples illustrate the invention but are not to be construed as limiting:

*Example 1*

N,N'-di-n-butyl dithiooxamide was dissolved in a mixture containing 4.0 percent by volume of a polyoxyethylene-sorbitol oleate-laurate (Atlox 1045A) in a petroleum hydrocarbon fraction boiling at from 190° to 272° F. (Standard Thinner No. 250) to prepare an emulsifiable concentrate composition containing 100 grams of the dithiooxamide compound per liter of ultimate mixture.

The above concentrate composition was dispersed in water to produce an aqueous spray composition containing 0.05 percent by weight of the dithiooxamide, and the aqueous composition thereafter employed for the control of vigorously growing plots of rape, canary grass and water grass. In such operations, the plants in the plots were sprayed with the aqueous composition at a substantially uniform dosage of about 0.8 pound of N,N'-di-n-butyl dithiooxamide per acre. Untreated plots of the named plant species were maintained as controls.

One week later, the plots were examined to ascertain what control of growth had been obtained. The examination indicated that a 90 percent control of water grass and a 100 percent control of rape and canary grass had been obtained in the treated plots. At the time of observation, the check plots were found to support luxuriant and vigorously growing stands of the named plant species.

*Example 2*

Various dithiooxamides were dissolved in acetone to prepare concentrate compositions containing 40 grams of active ingredient per liter of ultimate mixture. These concentrates were thereafter dispersed in water to produce aqueous spray compositions containing 0.1 percent and 1.0 percent by weight of one of the dithiooxamide compounds, and the aqueous composition employed in the manner as described in Example 1 for the control of canary grass. In such operations, the plants were sprayed with the compositions at substantially uniform dosages, respectively, of 1.6 and 16 pounds of toxicant per acre. Untreated plots of canary grass were maintained as checks. One week later, the treated plots were examined to ascertain what degree of control of canary grass had been obtained. The results are set forth in the following table.

| Active Ingredient | Percent Control of Canary Grass | |
|---|---|---|
| | 1.6 Pounds Per Acre | 16 Pounds Per Acre |
| N,N'-diethyl dithiooxamide | 2 | 100 |
| N,N'-di-n-propyl dithiooxamide | 100 | 100 |
| N,N'-diisobutyl dithiooxamide | 100 | 100 |
| N,N'-di-sec.-butyl dithiooxamide | 100 | 100 |
| N,N'-diisoamyl dithiooxamide | 0 | 100 |
| N,N'-di-n-amyl dithiooxamide | 100 | 100 |
| N,N'-di(1-methylbutyl) dithiooxamide | 100 | 100 |

At the time of observation, the check plots were found to support vigorously growing stands of canary grass.

Example 3

N,N'-di-n-butyl dithiooxamide was dissolved in a petroleum distillate solution (Standard Thinner No. 250) containing 4.0 percent by volume of Atlox 1045A to prepare a concentrate composition containing 40 grams of the dithiooxamide compound per liter of ultimate mixture.

This concentrate was dispersed in water to produce an aqueous spray composition containing varying concentrations of toxicant, and the aqueous composition employed for the maturation and defoliation of plots of field cotton. In such operations, the cotton plants were uniformly sprayed with the aqueous compositions at 250 gallons per acre. The cotton was of the Acala variety, from 24 to 42 inches in height, and quite mature with about 90 to 95 percent of the bolls open. The foliage was starting to redden. The weather was calm and clear and the temperature was about 77° F. Untreated plots of cotton plants were maintained as checks.

Fourteen days following treatment, the field was inspected to ascertain the percent defoliation or maturation that had taken place. The results are set forth in the following table together with the concentrations of toxicant in the treating compositions and the dosages at which the compositions were employed.

| Percent by weight of Dithiooxamide in the Treating Composition | Dosage of Dithiooxamide in Pounds Per Acre | Percent Defoliation |
|---|---|---|
| 0.05 | 1.0 | 43 |
| 0.1 | 2.0 | 57 |
| 0.15 | 3.0 | 69 |

At the time of observation, the bolls were found to be unstained by the treating material. The stands of check plants were in rank growth and exhibited little tendency toward maturing.

Example 4

N,N'-diethyl dithiooxamide was dissolved in an acetone solution containing 4.0 percent by volume of a polyoxyethylene glycol oleate (Prosol 1001A) to prepare a concentrate composition containing 40 grams of the dithiooxamide per liter of ultimate mixture.

A concentrate composition containing 40 grams of N,N'-diisoamyl dithiooxamide per liter of ultimate mixture was similarly prepared with the same emulsifying agent and solvent.

In a further operation, N,N'-di-n-hexyl dithiooxamide was dissolved in a petroleum distillate solution (Standard Thinner No. 250) containing 4.0 percent by volume of Atlox 1045A to produce an emulsifiable concentrate containing 40 grams of toxicant per liter of ultimate mixture.

These concentrate compositions were dispersed in water to produce aqueous spray compositions containing one percent by weight of toxicant and the aqueous compositions employed for the maturation and defoliation of field cotton of the Acala variety in the manner as described in Example 3. At the time of treatment, the cotton was quite mature with about 90 to 95 percent of the bolls open. In the treating operations, the plants were sprayed with the compositions at 250 gallons per acre to apply a substantially uniform dosage of about 20 pounds of toxicant per acre. Untreated check plots were maintained as controls. Fourteen days later, the cotton was examined to determine what defoliation had been obtained. The results are set forth in the following table:

| Active Ingredient | Percent Defoliation |
|---|---|
| N,N'-diethyl dithiooxamide | 62 |
| N,N'-diisoamyl dithiooxamide | 64 |
| N,N'-di-n-hexyl dithiooxamide | 75 |

At the time of observation, the bolls on the treated cotton were found to be unstained by the treating material with the majority of the bolls opened. In the check plots there was little defoliation of the plants.

Example 5

N,N'-di-n-butyl dithiooxamide, N,N'-diisoamyl dithiooxamide and N,N'-di-n-hexyl dithiooxamide were dissolved in a Standard Thinner No. 250 solution containing 4.0 percent by volume of Atlox 1045A to prepare concentrate compositions containing 18.8 grams of one of the dithiooxamides per liter of ultimate mixture.

In a similar manner, N,N'-diethyl dithiooxamide was dissolved in the same carrier mixture to obtain a concentrate composition containing 37.5 grams of toxicant per liter of ultimate mixture.

The above concentrate compositions were dispersed in water to produce aqueous spray compositions containing various concentrations of one of the dithiooxamide compounds, and the aqueous compositions thereafter employed for the maturation and defoliation of peppers. In such operations, plots of mature pepper plants were sprayed with the compositions at the rate of 100 gallons per acre to apply various dosages of toxicant per acre. Untreated plots of pepper plants were maintained as checks.

Seven days after treatment, the plots were examined to determine what defoliation had been obtained. The results are set forth in the following table:

| Active Ingredient | Percent by Weight of Active Ingredient in Treating Composition | Dosage of Active Ingredient In Pounds Per Acre | Percent Defoliasion |
|---|---|---|---|
| N,N'-diethyl dithiooxamide | 1.0 | 8 | 77 |
| N,N'-di-n-butyl dithiooxamide | 0.025 | 0.2 | 95 |
| N,N'-diisoamyl dithiooxamide | 0.4 | 3.2 | 90 |
| N,N'-di-n-hexyl dithiooxamide | 0.4 | 3.2 | 96 |

In the check plots, the plants were green and lush and showed no sign of defoliation.

Example 6

The following parts by weight of ingredients were mechanically mixed together to produce a concentrate composition in the form of an emulsifiable liquid.

| | |
|---|---|
| N,N'-di-n-butyl dithiooxamide | 45.11 |
| Sorbitan monolaurate (Span 20) | 3.00 |
| Trioleate of a sorbitan polyoxyethylene derivative (Tween 85) | 2.00 |
| Standard Thinner No. 250 | 8.00 |
| Methylene chloride | 41.89 |

The above concentrate was dispersed in water together with an additional emulsifying and dispersing agent to produce an aqueous spray composition containing 2 pounds of toxicant and 6 ounces of the dispersing agent per 30 gallons of ultimate mixture. The employed dispersing agent was a hydroxy polyoxyethylene-polyhydroxypropylene monoether of di-sec.-butylphenol. This aqueous composition was employed for the maturation and defoliation of field cotton of the Acala variety which was from 3 to 5 feet in height. The plants were nearly mature with dense foliage, and 30 percent of the bolls open. The soil was dry at the time of application, the last irrigation having been about two weeks previous. The weather during the application and interim of inspection was dry with temperatures of from 60° to 85° F. The application was made with a power sprayer at 95 pounds per square inch, employing a high clearance boom which permitted the coverage of two rows in a single application. The spray volume was 30 gallons per acre with the spray droplets penetrating down through the foliage.

Three weeks after treatment, the treated cotton was examined and a 95 percent defoliation observed. Further, a majority of the bolls were found fully opened and in a much advanced state of maturity as compared to those in adjacent check areas. The maturity and defoliation was such as to permit a 90 to 95 percent harvest in a single picking operation.

*Example 7*

27.8 parts by weight of N,N'-di-n-butyl dithiooxamide was dissolved in 91.8 parts of acetone and the resulting solution dispersed in water containing 1000 parts per million parts by weight of gum arabic to produce an aqueous spray composition containing 1 pound of toxicant per 20 gallons of ultimate mixture. This composition was applied to field cotton of the Acala variety which was from 2 to 3 feet in height. The cotton was quite mature with dense foliage which was beginning to redden. The application was made at a substantially uniform dosage of one pound per acre.

Two weeks later, the treated cotton was inspected and an 81 percent defoliation observed. At the time of observation, adjacent untreated check cotton was in rank growth and showed no tendency toward defoliation.

*Example 8*

An acetone solution containing 25 parts by weight of N,N'-di-n-propyl dithiooxamide is dispersed in water containing 1000 parts per million parts by weight gum arabic to produce an aqueous spray composition containing 2 pounds of active ingredient per 20 gallons of ultimate mixture. This composition is applied to field cotton of the Acala variety from 2 to 3 feet in height a substantially uniform dosage of 2 pounds per acre. Two weeks later, the treated cotton is inspected and an 80 percent defoliation observed with little tendency toward defoliation in adjacent untreated checks.

*Example 9*

Various dithiooxamides were dissolved in acetone to prepare concentrate compositions containing 40 grams of active ingredient per liter of ultimate mixture and the concentrates thereafter dispersed in water to produce aqueous spray compositions containing, respectively, 0.1 and 1.0 percent by weight of one of the dithiooxamide compounds. Plots of rape were sprayed with these aqueous compositions at 200 gallons per acre to supply substantially uniform dosages of 1.6 and 16 pounds of toxicant per acre. Untreated plots of rape were maintained as controls. One week later, the treated plots were examined to ascertain what degree of control had been obtained. The results are set forth in the following table.

| Active Ingredient | Percent Control of Rape | |
|---|---|---|
| | 1.6 Pounds Per Acre | 16 Pounds Per Acre |
| N,N'-Diethyl dithiooxamide | 0 | 92 |
| N,N'-Di-n-propyl Dithiooxamide | 100 | 100 |
| N,N'-diisobutyl dithiooxamide | 100 | 100 |
| N,N'-di-sec.-butyl dithiooxamide | 90 | 100 |
| N,N'-di-n-amyl dithiooxamide | 100 | 100 |
| N,N'-di (1-methyl-butyl) dithiooxamide | 100 | 100 |
| N,N'-di-n-hexyl dithiooxamide | 95 | 100 |

At the time of observation, the check plants were found to support vigorously growing stands of rape.

*Example 10*

An aqueous dispersion containing 2 pounds of N,N'-di-n-butyl dithiooxamide per 15 gallons of ultimate mixture was employed for the maturation of rice. In such operations, field rice was uniformly sprayed with the composition at a dosage of 2 pounds of the dithiooxamide compound per acre. The rice was of the Calora variety and nearly mature enough for harvest. The application brought about a fifty percent burn of the leaf and stalk surfaces of the plants and a seventy percent burn in the region of the neck of the grain stalk so as to effect a substantial decrease in the moisture content of the hull rice grain prior to harvest.

The N,N'-dialkyl dithiooxamide compounds as employed in accordance with the present invention may be prepared by mixing or otherwise blending at least two molecular proportions of a suitable alkylamine with one molecular proportion of dithiooxamide. The reaction is somewhat exothermic and takes place smoothly at temperatures of from 0° to 40° C. The contacting of the reagents conveniently may be carried out in an organic solvent such as methanol, ethanol or ether. Following the reaction, the desired product may be separated by conventional methods, i. e. washing with water, filtration and decantation. Representative members of the N,N'-dialkyl dithiooxamide compounds are characterized by the melting points set forth in the following table:

| | ° C. |
|---|---|
| N,N'-diethyl dithiooxamide | 57–59 |
| N,N'-di-n-propyl dithiooxamide | 15–16.5 |
| N,N'-di-n-butyl dithiooxamide | 36–38 |
| N,N'-di-isobutyl dithiooxamide | 33.5–34.5 |
| N,N'-di-sec.-butyl dithiooxamide | 53.5–57.5 |
| N,N'-di(1-methylbutyl)dithiooxamide | 18–20 |
| N,N'-di-isoamyl dithiooxamide | 55.5–56.5 |

The expression "surface active dispersing agent" as herein employed is intended to include all agents which are capable of acting at the interfacial surface between the dithiooxamides and water as the dispersion medium, so as to facilitate the dispersion of the dithiooxamide compound in water. Thus, the term is inclusive of the solid emulsifying agents such as finely divided aluminum hydroxide and finely divided bentonite, fuller's earth, attapulgite and other clays, as well as the ionic and nonionic wetting and emulsifying agents such as the alkaline earth metal caseinates, alkyl aryl sulfonates, sulfonated oils, complex organic ester derivatives, complex ether alcohols, and the like.

The term "finely divided inert solid" as herein employed refers to materials which are incapable of facilitating the dispersion of the water-immiscible dithiooxamides in water as the dispersion medium and is intended to include finely divided materials such as chalk, talc, gypsum and the like.

I claim:

1. A method for modifying the growth characteristics of plants which comprises exposing the plants to the action of a growth altering amount of a dithiooxamide of the formula

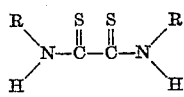

wherein R represents an alkyl radical containing from 2 to 6 carbon atoms, inclusive.

2. A method for suppressing the growth of vegetation which comprises contacting the foliage of such vegetation with a growth inhibiting amount of dithiooxamide of the formula

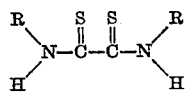

wherein R represents an alkyl radical containing from 2 to 6 carbon atoms, inclusive.

3. A method for promoting the maturing of crops and facilitating the harvest which comprises the step of applying to the crops near the end of their normal growing season a dithiooxamide of the formula

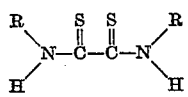

wherein R represents an alkyl radical containing from 2 to 6 carbon atoms, inclusive, such compound being employed at a dosage sufficient substantially to accelerate the maturing of the crops.

4. A method for defoliating field crops to promote the maturing of the crops and facilitate their harvest which comprises the step of applying to the crops near the end of their normal growing season a dithiooxamide of the formula

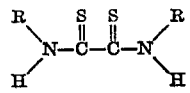

wherein R represents an alkyl radical containing from 2 to 6 carbon atoms, inclusive, such compound being employed at a dosage sufficient substantially to accelerate the defoliation of the crop.

5. A method for modifying the growth characteristics of plants which comprises exposing the plants to the action of a growth altering amount of N,N'-di-n-butyl dithiooxamide.

6. A method for modifying the growth characteristics of plants which comprises exposing the plants to the action of a growth altering amount of N,N'-di-n-propyl dithiooxamide.

7. A method for modifying the growth characteristics of plants which comprises exposing the plants to the action of a growth altering amount of N,N'-di-isobutyl dithiooxamide.

8. A method for modifying the growth characteristics of plants which comprises exposing the plants to the action of a growth altering amount of N,N'-di-isoamyl dithiooxamide.

References Cited in the file of this patent

UNITED STATES PATENTS

| | | |
|---|---|---|
| 2,430,332 | Guy et al. | Nov. 4, 1947 |
| 2,484,257 | Watson et al. | Oct. 11, 1949 |
| 2,525,075 | Levesque | Oct. 10, 1950 |
| 2,618,545 | Newcomer | Nov. 18, 1952 |
| 2,634,226 | Kosolapoff | Apr. 7, 1953 |
| 2,663,629 | Semon | Dec. 22, 1953 |
| 2,668,758 | Roos et al. | Feb. 9, 1954 |

OTHER REFERENCES

Thompson et al. in the "Botanical Gazette," vol. 107, pages 476 to 507.

Liebermeister, Chemical Abstracts, vol. 44, page 7987(e), 1950.

Thompson et al., Chemical Abstracts, vol. 41, pages 3902(d) to 3912(h), 1946.